March 11, 1969 E. FRANK ET AL 3,431,787

ELECTRONIC TUNING APPARATUS

Filed March 17, 1965

INVENTORS
RALPH BRAY
EDWARD FRANK

BY Harry W. Hargis III
AGENT

United States Patent Office 3,431,787
Patented Mar. 11, 1969

3,431,787

ELECTRONIC TUNING APPARATUS

Edward Frank, Glenolden, Del., and Ralph Bray, Philadelphia, Pa., assignors to Philco-Ford Corporation, Philadelphia, Pa., a corporation of Delaware Filed Mar. 17, 1965, Ser. No. 440,563
U.S. Cl. 74—10.27 1 Claim
Int. Cl. F16h *25/18, 35/18;* H03j *5/32*

ABSTRACT OF THE DISCLOSURE

A releasably coupled mechanical linkage unites an electronic tuner with the purely mechanical tuner drive apparatus of an automobile pushbutton radio. The electronic tuner is of the variable permeability type, including coils, coil cores, and carriage means for the coil cores. The tuner is electronically aligned prior to being releasably coupled with its mechanical drive apparatus. The mechanical drive is operated either by pushbuttons or by a rotatable knob.

This invention relates to electronic tuning apparatus, and especially to push-button operated tuning apparatus. While of broader applicability, the invention has particular utility in the field of automobile radios, and has to do with improvements in tuning apparatus of the kind claimed in the copending application, now abandoned of Edward Frank, Ser. No. 438,953, filed Mar. 11, 1965, and assigned to the assignee of the present invention.

The apparatus of said Frank invention is featured by the provision of simple and effective means for uniting the electronic part of a tuner containing a movable core carriage, coil cores, coil forms and related circuit elements, with another, purely mechanical part comprising pushbuttons, a treadle bar actuatable by the pushbuttons, and mechanism for transferring motion from the actuated treadle bar to the movable core carriage.

The presently claimed invention relates to improvements in the claimed apparatus of the above-identified Frank invention, which improvements both facilitate assembly and further enhance compactness of the apparatus. The improvements have to do particularly with means for conveniently coupling the mechanical portion with the electronic portion of tuning apparatus, as well as means for facilitating assembly and operation of the portions themselves.

It is a general objective of this invention to provide improved electronic tuning apparatus.

It is an additional objective of the present invention to provide novel means which lends itself to the compactness of structure desired of an automobile radio.

The manner in which the foregoing, as well as other objects and advantages of the invention, may best be achieved will be more fully understood from a consideration of the following detailed description, taken in light of the accompanying drawing in which.

Figures 1, 2:
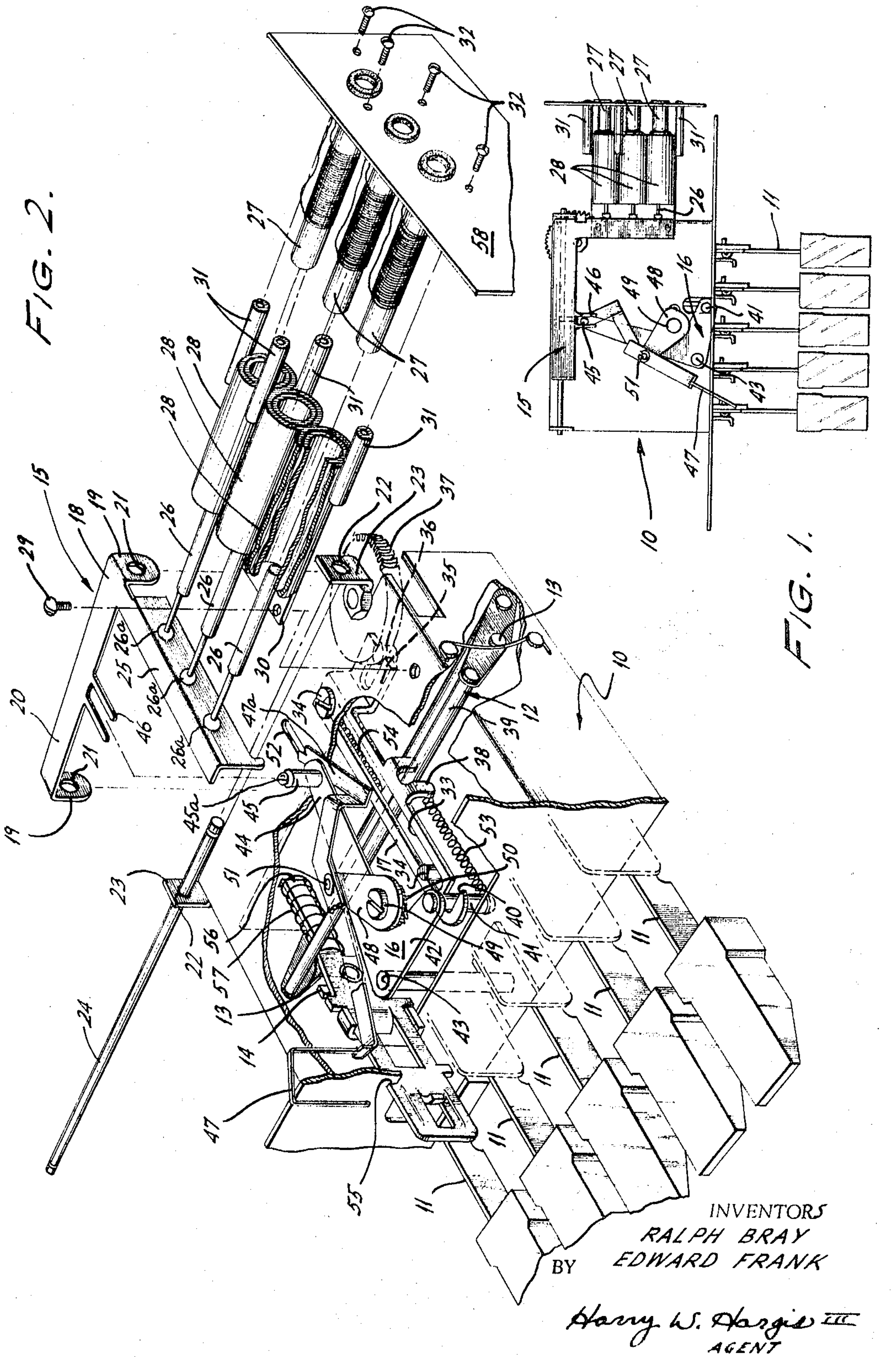
FIGURE 1 is a plan view of tuning apparatus embodying the invention.
FIGURE 2 is an exploded view, with parts broken away, of apparatus illustrated in FIGURE 1.

With more detailed reference to the drawing, and first to FIGURE 1, apparatus constructed in accordance with a preferred embodiment of the invention includes a frame structure 10 housing push-button slides 11 movable between the illustrated extended position and a retracted operative position. As illustrated in FIGURE 2, the slides extend through and are movable within slots 55 and 56 in front and rear walls, respectively, of the housing. A treadle bar 12 operable by slides 11 is rotatable about its pivots 13 provided in opposed end walls of the frame structure. Frame structure 10 conveniently may be formed of bent-up sheet metal of suitable thickness to ensure its rigidity. Cams 14, only one of which is shown, are provided on slides 11, in accordance with conventional practice, and are positioned operably to engage treadle bar 12 upon rearward movement of a slide in response to pressure exerted against its pushbutton, in a manner similar to that of the referenced disclosure and well known in the art. The slides 11, only one of which is shown in detail, are urged to extended, or left-hand position as seen in FIGURE 2, by springs 57, and each of cams 14 is adjustable to a different position in order that the treadle bar will be moved to a correspondingly different rotated position.

A core carriage 15 is movable transversely of the direction of movement of the pushbutton slides 11 and is operable by the treadle bar 12 through linkage means including bell crank 16 and slide bar 17, which linkage means will be more fully described hereinafter. Carriage 15 comprises an L-shaped member 18, for example a bent-up sheet metal stamping, having tabs 19 turned downwardly from one leg portion 20 and including axially aligned holes 21 positioned therein for alignment with holes 22 in upwardly presented tabs 23 on frame 10. A rod 24 extends with a slight clearance through holes 21 and is held frictionally within the holes 22. By this arrangement, carriage 15 is slidable along rod 24 in its tuning operation, as will be more fully described. The other leg portion 25 of the carriage has coil cores 26 affixed thereto by suitable known means, so that the cores extend into coil forms 27 as shown, in the direction of movement of carriage 15. The cores 26 and coils wound about coil forms 27 comprise variable permeability tuning elements for an AM broadcast band radio receiver. As will become more apparent from what follows, the mechanism thus far described has utility in the field of AM broadcast band receivers, as well as in combination AM–FM receivers.

An electronic component chassis 58, for example a printed wiring panel, extends both vertically and from front to rear as respects frame 10. Chassis 58 includes tuning coils and their forms 27 presented for extension into the coil shields, and associated circuits (not shown). The coil cores 26 extend into the open central portions of coil forms 27, and shields 28 are mounted by screws 29 to maintain this coil, coil forms and core relationship. These screws 29 extend through tab means 30 on the shields and into threaded holding engagement with the top wall of frame 10. Coil shields 28 conveniently are comprised of a unitary metal casting, and also include spacer means 31 provided with internally threaded portions for receiving screws 32 to hold chassis 58 in place.

Considering the carriage operating linkage in more detail, the slide bar 17 preferably comprises a bentup sheet metal stamping which includes a central longitudinal slot 33 through which extend studs 34 that are presented downwardly from an upper horizontal wall of the frame and retain the slide bar for sliding movements with respect to the frame. A slotted tab 35 extends laterally from one end portion of the slide bar so that its bifurcations slidably engage a stud 36 on wheel 37, that may be operably linked to a manual tuning knob (not shown). Since disclosure of mechanism associating the manual tuning knob with the wheel 37 is not required for an understanding of the present invention, none will be described.

Another slotted tab 38 depends from the slide bar and includes bifurcations that slidably engage opposite sides of the upper rod 39 of treadle bar 12. A forward, laterally slotted end portion 40 of the slide bar is connected by pin 41 to one arm 42 of bell crank 16 that is pivotally mounted at 43 upon the upper horizontal wall of frame 10. The other arm 44 of bell crank 16 includes a stud 45 that is linked to a bifurcate, core carriage actuator tab 46 provided on leg portion 20 of carriage member 18. Stud 45 on the bell crank includes a necked-down portion 45*a* to receive the tab 46, and cooperates with the rod and tab construction to support carriage 15.

An index pointer 47 is pivoted at 51 upon the end of an arm 48 rotatable about its pivot 49 on frame 10. A gear connection 50 between arm 48 and bell crank 16 links the arm and the pointer affixed thereto for drive by the bell crank. Pointer 47 includes an offset end portion 47*a* spaced from its pivot 51 and provided with downturned tab (not shown) slidable within a slot 52 provided in the upper horizontal wall of frame 10. Pointer 47 is offset in the region of its slide connection with slot 52 in order to prevent its interference with the movements of bell crank arm 44. As bell crank 16 rotates, it causes the arm 48 to rotate in the opposite direction about its pivot 49, and move the pivot 51 through an arc proportional to the radius of the arm. This causes pointer 47 to rotate about the moving pivot 51 and slide within slot 52, while its free end moves substantially linearly across a station dial (not shown) disposed in front of the frame and just about the slots.

Additional illustrated elements of the mechanism include a pair of coil tension springs 53, 54, one extending between the pin 41 and the upper rod 39 of the treadle bar, and the other extending between a rear portion of the bar and the same rod of the treadle bar, whereby resilient forces are exerted on these elements to minimize backlash.

Considering the operation of the present embodiment of the invention, depressing a push-button slide 11 in the direction of its length moves cam 14 into operating engagement with rotatable treadle bar 12. As treadle bar 12 is rotated, slide bar 17 linked to the treadle bar by slotted tab 38 is moved in the direction of its length across the under surface of the top wall of frame 10. As slide bar 17 is moved, bell crank 16 is pivoted by virtue of the pin and slot connection 40, 41 between the bar and the crank. As the bell crank is pivoted, carriage 15 is moved by the connection comprising the stud 45 and the carriage actuator tab 46, whereby cores 26 are moved to their predetermined tuning position within coil forms 27, in correspondence with the depressed push-button slide.

As indicated previously, the apparatus illustrated may also be tuned by conventional manually rotatable means (not shown) coupled with wheel 37, which may be a gear as illustrated. Rotation of wheel 37 drives the slide bar, through the connection of stud 36 with slotted tab 35, and the slide bar in turn drives the bell crank and core carriage linked thereto.

Considering now the assembly of the apparatus in accordance with the principles of the invention, frame 10 is first provided and equipped with the slide bar 17, the treadle bar 12, push-button slides 11, the bell crank 16, the indicator arm 48, and indicator 47. In a separate operation, the core shields 28 and chassis 58 with the coils 27 attached are assembled into a unit, followed by insertion of the cores 26, affixed to carriage 15 by suitably known means such as rubber grommets 26*b*, into the open central portions of the coil forms. The carriage, coil, coil form, coil shield and chassis sub-assembly is then moved toward the frame assembly, and the actuator tab 46 engaged with the bell crank stud 45. The holes 21, 22 in tabs 19, 23 are then aligned and rod 24 inserted through the holes and frictionally attached to tabs 23 on the frame.

A portion of the push-button slides may be used to operate the carriage to positions other than those required to tune the illustrated AM circuit elements. The unused carriage positions may be utilized for FM circuit tuning elements disposed and adapted for operation by the disclosed mechanism.

In summation, the invention achieves an unusually simple and compact radio tuning assembly composed of separately manufactured and readily connectable mechanical and electronic subassemblies.

We claim:

1. In tuning apparatus for an electronic receiver: framing means; a treadle bar pivotally mounted on said framing means; push-button slide means operably linked to said treadle bar and movable on said framing means between a pair of positions, said slide means being operable, upon movement to one of said positions, to pivot said treadle bar; an elongated slide-bar mounted on said framing means for sliding movements in the direction of its length and transverse the pivotal axis of said treadle bar, said slide-bar including first, second, and third slotted tab means, said first tab means disposed astride said treadle bar and defining a linkage providing for sliding movements of said slide-bar with said treadle bar as the latter is pivoted by said push-button slide means; manually rotatable means on said framing means and including a pin operably linked with said second slotted tab means of said slide-bar to move the latter; a bell crank pivotally mounted on said framing means and including first and second pins on arms thereof, said first pin on said bell crank engaging said third slotted tab means and defining a driving connection between said slide-bar and said bell crank whereby the latter is pivoted in response to movements of said slide-bar; tuning means disposed and adapted for reciprocating movements in a direction extending transverse the direction of movement of said push-button slide means; and releasable coupling means including said second pin on said bell crank operably connected with means defining a slot on said tuning means, and providing for such reciprocating movements of said tuning means in response to movements of said slide-bar as imparted thereto either by said push-button slide means and treadle bar, or by said manually rotatable means.

References Cited

UNITED STATES PATENTS

| | | | |
|---|---|---|---|
| 1,925,976 | 9/1933 | Bracken | 74—110 |
| 2,344,091 | 3/1944 | Kirk | 334—7 X |
| 2,512,258 | 6/1950 | Piffer | 334—7 X |
| 2,534,768 | 12/1950 | Hall | 334—64 X |
| 2,875,620 | 3/1959 | Heselwood | 334—7 X |
| 2,924,101 | 2/1960 | Sherman | 74—110 X |
| 3,163,837 | 12/1964 | Teaf | 334—7 |
| 3,251,012 | 5/1966 | Kazyk et al. | 334—7 X |

FOREIGN PATENTS

| | | |
|---|---|---|
| 486,759 | 9/1952 | Canada. |

ELI LIEBERMAN, *Primary Examiner.*

W. H. PUNTER, *Assistant Examiner.*

U.S. Cl. X.R.

74—110; 334—7, 85